United States Patent [19]

Houtlosser

[11] 4,146,666
[45] Mar. 27, 1979

[54] THERMALLY EXPANSIBLE SHEET

[75] Inventor: Wim J. Houtlosser, Monnickendam, Netherlands

[73] Assignee: Borg-Warner Corporation, Chicago, Ill.

[21] Appl. No.: 822,600

[22] Filed: Aug. 8, 1977

[51] Int. Cl.² .......................... B32B 3/28; B32B 7/02
[52] U.S. Cl. ..................................... 428/180; 52/573; 264/284; 264/293; 428/179; 428/212
[58] Field of Search ............... 428/172, 174, 179, 180, 428/212; 264/284, 293; 52/573

[56] References Cited

U.S. PATENT DOCUMENTS

| | | | |
|---|---|---|---|
| 3,011,602 | 12/1961 | Ensrud et al. | 428/180 |
| 3,018,015 | 1/1962 | Agriss et al. | 428/179 |
| 3,118,523 | 1/1964 | Girot | 52/573 |
| 3,279,973 | 10/1966 | Arne | 428/178 |
| 3,302,358 | 2/1967 | Jackson | 52/573 |
| 3,525,663 | 8/1970 | Hale | 428/180 |
| 3,956,543 | 5/1976 | Stangeland | 428/179 |

Primary Examiner—George F. Lesmes
Assistant Examiner—P. Thibodeau
Attorney, Agent, or Firm—William S. McCurry

[57] ABSTRACT

An expansible panel capable of deforming and absorbing stresses caused by thermal expansion and contraction comprising a single sheet formed of a plurality of frusto-pyramids of different sizes, each having a base, a top and depending sides and whose dimensions are such that any combination of frusto-pyramids will not produce a straight line longer than 1.5 times the base of the largest pyramid.

2 Claims, 3 Drawing Figures

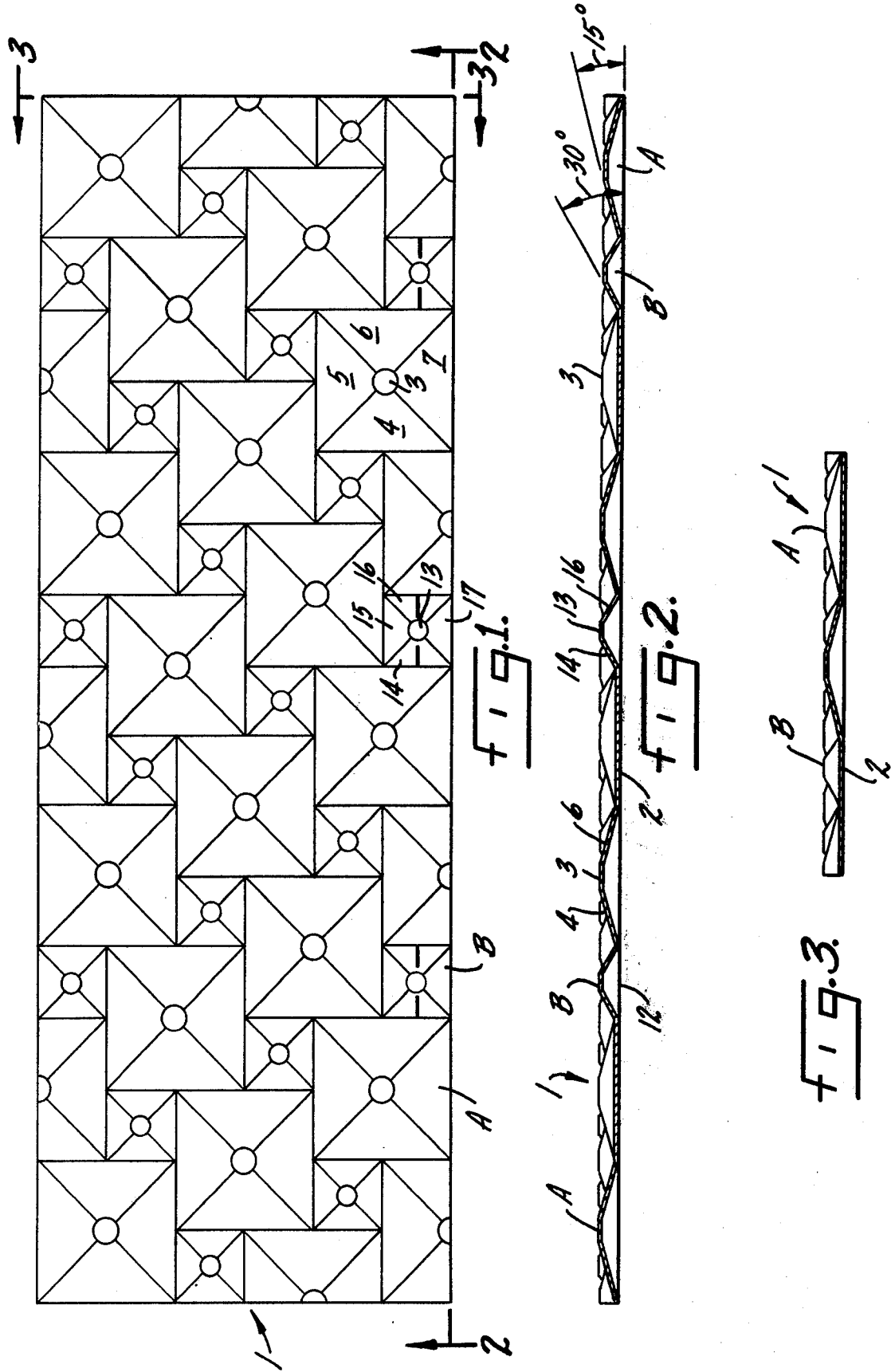

THERMALLY EXPANSIBLE SHEET

BACKGROUND AND SUMMARY OF THE INVENTION

The present invention relates to thermoplastic sheet having a surface contour which permits the sheet to expand and contract under extreme ambient temperatures without rupturing.

Thermoplastic polymers such as graft acrylonitrile-butadiene-styrene (ABS) are being used more and more as a substitute for other materials in structures where large flat sheets or plates are utilized, such as, for example, in refrigerator car door liners, in camper bodies and the like. In such applications the ambient temperature may range from −40° C. to +80° C. Under such extreme temperature differences the thermoplastic sheet expands and contracts and will rupture on expansion unless the sheet is properly designed from a structural standpoint. In smaller structures it may only be necessary to provide mounting apertures of a size to permit the sheet to move within its mounting. In larger structures, however, other means must be provided to permit the thermoplastic sheet to expand without consequent rupturing or tearing. It is therefore common practice to corrugate the sheet to permit expansion without rupture. However, this permits expansion in only one direction and is not satisfactory for such large applications as the panel for refrigerated transport containers.

The present invention provides a structure which permits the sheet or panel to the firmly attached or connected to its mounting and to absorb internal stresses and strains due to extreme temperature changes.

THE DRAWINGS

Further advantages of the present invention will be apparent from the following description, reference being had to the accompanying drawing wherein:

FIG. 1 is a plan view of the present expansible panel;

FIG. 2 is a sectional view taken on the line 2—2 of FIG. 1; and

FIG. 3 is a sectional view taken on the line 3—3 of FIG. 1.

DESCRIPTION OF THE PREFERRED EMBODIMENT

In the drawings, the expansible sheet or panel 1 is thermoformed from Cycolac ABS resin manufactured by Borg-Warner Chemicals, Amsterdam, Holland. The resin is a graft polymer prepared by polymerizing styrene and acrylonitrile in the presence of a polybutadiene rubber substrate. It contains 30 parts by weight butadiene, 45 parts by weight styrene and 25 parts by weight acryionitrile. Other ABS resins can be used to make panel 1, as well as other thermoplastics which tend to rupture under thermal stress.

The panel 1 is formed of a plurality of frusto-pyramids which will absorb thermally caused stresses and strains by the deformation of one or more pyramids and thus prevent the rupture of the thermoplastic panel. Thus, the surface of the panel 1 comprises a plurality of frusto-pyramids A and a plurality of interconnecting frusto-pyramids B. The frusto-pyramids A have a base 2, a top 3 and depending sides 4, 5, 6 and 7. The depending sides have an angle of 15° from the base 2. The frusto-pyramids B, which are one half the size of the pyramids A, have a base 12, a top 13 and depending sides 14, 15, 16 and 17. The depending sides have an angle of 30° with respect to the base 12.

The panel 1 is designed so that the base 12 of the frusto-pyramid B has a length and width of X; the base 2 of the frusto-pyramid A has a length and width of 2X; the top 13 of the pyramid B has a diameter of 1/5X and the top 3 of the pyramid A has a diameter of 1/4X. The actual size of the panel 1 depicted in the drawings is 248 cm long by 84 cm wide. X is thus 14 cm, the length and width of the base 12; the base 2 is 28 cm; the top 13 is 2.8 cm in diameter and the top 3 is 3.5 cm.

In construction the panel 1 is firmly and securely attached or connected to another structure which has a considerable amount of difference in thermal expansion and contraction. The design of the panel is such that any combination of frusto-pyramids A and B will not produce a straight line longer than 1.5 times the base of the pyramid A. Stresses and strains induced in this straight line of the panel by thermal expansion and contraction will be absorbed by the deformation of the adjacent pyramid A at the end of each straight line.

Panels of the aforedescribed construction can be utilized in the manufacture of panels for refrigerated transport containers, railroad wagons and the like.

I claim:

1. An expansible panel capable of deforming and absorbing stresses caused by thermal expansion and contraction comprising a single sheet of thermoplastic material formed of a plurality of frusto-pyramids of two different sizes, each having a base, a top and depending sides and whose dimensions are such that any combination of the two sizes of frusto-pyramids will not produce a straight line longer than 1.5 times the base of the largest pyramid, one of said different size frusto-pyramid being half the size of the other at the base thereof and correspondingly smaller at the top thereof, both said frusto-pyramids having the same height, said larger pyramid having depending sides which form an angle of 15° with its base and said smaller pyramid having depending sides which form an angle of 30° with its base; the diameter of the larger pyramid, at its top, being equal to one fourth of the length of its base and the diameter of the smaller pyramid, at its top, being equal to one fifth the length of the base of said larger pyramid.

2. The expansible panel of claim 1 wherein the thermoplastic material is a graft ABS polymer.

* * * * *